United States Patent
Baldemair et al.

(10) Patent No.: US 11,387,964 B2
(45) Date of Patent: Jul. 12, 2022

(54) PUCCH CONFIGURATION WITH HARQ CODEBOOK SIZE

(71) Applicant: Telefonaktiebolaget LM Ericsson (publ), Stockholm (SE)

(72) Inventors: Robert Baldemair, Solna (SE); Daniel Larsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 140 days.

(21) Appl. No.: 16/753,989

(22) PCT Filed: Oct. 8, 2018

(86) PCT No.: PCT/IB2018/057783
§ 371 (c)(1),
(2) Date: Apr. 6, 2020

(87) PCT Pub. No.: WO2019/073358
PCT Pub. Date: Apr. 18, 2019

(65) Prior Publication Data
US 2020/0396039 A1 Dec. 17, 2020

Related U.S. Application Data

(60) Provisional application No. 62/570,420, filed on Oct. 10, 2017.

(51) Int. Cl.
*H04L 5/00* (2006.01)
*H04L 1/18* (2006.01)

(52) U.S. Cl.
CPC .......... *H04L 5/0055* (2013.01); *H04L 1/1812* (2013.01); *H04L 5/0007* (2013.01); *H04L 5/0042* (2013.01)

(58) Field of Classification Search
CPC ... H04L 5/0055; H04L 1/1812; H04L 5/0007; H04L 5/0042; H04L 1/1864; H04L 1/0073; H04L 1/1861
See application file for complete search history.

(56) References Cited

U.S. PATENT DOCUMENTS

2015/0349941 A1* 12/2015 Papasakellariou .... H04L 1/1614
370/280
2016/0295561 A1* 10/2016 Papasakellariou .... H04L 5/0055
(Continued)

FOREIGN PATENT DOCUMENTS

| EP | 3 324 565 A1 | 5/2018 |
|---|---|---|
| WO | 2016 123372 A1 | 8/2016 |
| WO | 2017 024539 A1 | 2/2017 |

OTHER PUBLICATIONS

3GPP TSG RAN WG1 Meeting #90b; Prague, CZ; Source: Qualcomm Incorporated; Title: Resource allocation for Pucch (R1-1718806)—Oct. 9-13, 2017.
(Continued)

*Primary Examiner* — Sharmin Chowdhury
(74) *Attorney, Agent, or Firm* — Baker Botts, LLP

(57) ABSTRACT

According to certain embodiments, a method by a wireless device for transmitting Hybrid Automatic Repeat Request (HARQ) feedback includes obtaining a Physical Uplink Control Channel (PUCCH) configuration parameter comprising a channel code type. Based on the PUCCH configuration parameter comprising the channel code type, a PUCCH format is selected for transmitting the HARQ feedback to a network node on the PUCCH, and the HARQ feedback is transmitted to the network node.

24 Claims, 15 Drawing Sheets

(56) References Cited

U.S. PATENT DOCUMENTS

| | | | |
|---|---|---|---|
| 2018/0234147 A1* | 8/2018 | Lee | H04B 7/0478 |
| 2019/0082435 A1* | 3/2019 | Noh | H04L 1/0073 |
| 2019/0150181 A1* | 5/2019 | Kim | H04L 1/1858 |
| | | | 370/329 |
| 2019/0199477 A1* | 6/2019 | Park | H04L 1/0067 |
| 2021/0297225 A1* | 9/2021 | Marinier | H04L 5/0055 |

OTHER PUBLICATIONS

PCT International Search Report for International application No. PCT/IB2018/057783—dated Jan. 15, 2019.
PCT Written Opinion of the International Searching Authority for International application No. PCT/IB2018/057783—dated Jan. 15, 2019.

* cited by examiner

PUCCH CONFIGURATION WITH HARQ CODEBOOK SIZE

PRIORITY

This nonprovisional application is a U.S. National Stage Filing under 35 U.S.C. § 371 of International Patent Application Serial No. PCT/IB2018/057783 filed Oct. 8, 2018 and entitled "PUCCH Configuration with HARQ Codebook Size" which claims priority to U.S. Provisional Patent Application No. 62/570,420 filed Oct. 10, 2017 both of which are hereby incorporated by reference in their entirety.

BACKGROUND

In carrier aggregation (CA), multiple component carriers are configured for one user equipment (UE). Component carriers can be configured into so called physical uplink control channel (PUCCH) groups. Hybrid automatic repeat request (HARQ) feedback for all component carriers of a PUCCH group are transmitted on the same uplink (UL) using PUCCH or Uplink Control Information (UCI) on Physical Uplink Shared Channel (PUSCH).

The Acknowledgment/Not-acknowledgment (ACK/NACK) bits which should be reported on a single PUCCH are arranged into the HARQ codebook. A HARQ codebook can contain ACK/NACK bits from the same or different component carriers and from one or multiple time instances. NR defines mini-slots and mixing of multiple numerologies on one carrier, and both features can lead to irregular transmission timings complicating the HARQ codebook design. NR also introduces HARQ feedback per group of code blocks of a transport block, a feature called Code Block Group (CBG) feedback. The CBG size can range from one code block per CBG to one CBG per transport block (same as in LTE). CBG-based HARQ feedback can substantially increase the amount of HARQ feedback signaling.

In a semi-statically configured HARQ codebook, at least the number of bits in the component carrier dimension is typically fixed. As soon as the UE detects at least one downlink (DL) assignment on any component carrier, the UE prepares a feedback bitmap that contains HARQ feedback of all configured or activated component carriers. Feedback for component carriers where no DL assignment has been detected is set to NACK. The number of feedback bits required for one component carrier is given by its Multiple-Input Multiple-Output (MIMO) configuration and its Code Block Group (CBG) configuration. The number of HARQ feedback bits required for all configured/activated component carriers is the sum across all configured/activated component carrier of the feedback bits required per component carrier.

The number of entries in the time-domain can also be fixed. Alternatively, feedback may be only reported for those time instances where at least one DL assignment is detected (on any of the configured/activated component carriers). In the latter case, a Downlink Assignment Index (DAI) is needed to protect against missed DL assignments. Preferably, a DAI is contained in all DL assignments and contains the number of time instances such as, for example, slots that has been scheduled up to and including the current slot.

A semi-statically configured HARQ codebook is simple and robust but can lead to high overhead, especially if there are many component carriers and often not all of them are scheduled and/or some component carriers are configured with CBG.

LTE Release 13 support a very large number of aggregated component carriers. A semi-statically configured HARQ codebook (in component carrier dimension) as has been used in earlier carrier aggregation is sub-optimal since for the semi-statically configured HARQ codebook feedback of all configured/activated component carriers is always included. Where a large number of component carriers are configured/activated but only a few component carriers are scheduled, the HARQ codebook size becomes unnecessarily large. Accordingly, in Release 13, a dynamic HARQ codebook has been introduced. The dynamic HARQ codebook is dynamic in both component carrier and time dimension. Here, each DL assignment, each of which is typically carried in a DCI, contains a counter and total DAI field. The counter DAI field counts the number of DL assignments that has been scheduled so far (including the current DL assignment) for the current HARQ codebook. The component carriers are ordered, for example, according to carrier frequency, and the counter DAI counts DL assignments in this order. Along the time axis, the counter DAI is not reset. Instead, the counter DAI is increased continuously at slot boundaries. The total DAI in each DL assignment is set to the total number of DL assignments that have been scheduled so far (including the current slot) for the current HARQ codebook. As such, the total DAI in a slot is set to the highest counter DAI of the slot. To save overhead, a modulo operation such as, for example, mod 2 is often applied to the counter DAI and total DAI which can then be expressed with a few bits. Where, for example, a mod-2 is used, it can be expressed in 2 bits. The counter/total DAI mechanism enables the receiver to recover the HARQ codebook size as well as indexing into the HARQ codebook if few contiguous DL assignments are missed. FIG. 1 illustrates an example of counter and total DAI. For simplicity, no modulo operation has been applied in the figure.

PUCCH can carry feedback related to HARQ such as ACK/NACK, UCI, SR, or beam related information.

NR defines a variety of different PUCCH formats. On a high level, the available PUCCH formats can be grouped into short and long PUCCH formats.

There are separate short PUCCH formats for ≤2 bit and >2 bit. Short PUCCH can be configured at any symbols within a slot. While, for slot-based transmissions, short PUCCH towards the end of a slot interval is the typical configuration, PUCCH resources distributed over or early within a slot interval can be used for scheduling request or PUCCH signaling in response to mini-slots.

PUCCH for ≤2 bit uses sequence selection. In sequence selection, the input bit(s) selects one of the available sequences and the input information is presented by the selected sequence. For example, for 1 bit, 2 sequences are required. For 2 bit, 4 sequences are required. This PUCCH can either span 1 or 2 symbols. In the case of 2 symbols, the same information is transmitted in a second symbol, potentially with another set of sequences and at another frequency. Another set of sequences, which may be referred to as sequence hopping, may be used to randomize interference. Transmitting at another frequency may achieve frequency-diversity.

PUCCH for >2 bit uses 1 or 2 symbols. In the case of 1 symbol, DM-RS and UCI payload carrying subcarriers are interleaved. The UCI payload is prior mapping to subcarriers encoded (either using Reed Muller codes or Polar codes, depending on the payload). In the case of 2 symbols, the encoded UCI payload is mapped to both symbols. For the 2-symbol PUCCH, typically the code rate is halved (in two symbols twice as many coded bits are available) and the second symbol is transmitted at a different frequency (to achieve frequency-diversity).

Similar to short PUCCH, there are also separate long PUCCH formats ≤2 bit and >2 bit. Both variants exist with variable length ranging from 4 to 14 symbols and can even be aggregated across multiple slots. Long PUCCH can occur at multiple positions within a slot with more or less possible placements depending on the PUCCH length. Long PUCCH can be configured with or without frequency-hopping while the latter has the advantage of frequency-diversity.

Long PUCCH for ≤2 bit is similar to PUCCH format 1a/1b in LTE with the exception that DM-RS are placed differently and the variable-length property.

Long PUCCH for >2 bit uses Time Division Multiple Access (TDM) between Demodulation-Reference Signal (DM-RS) and UCI-carrying symbols. UCI payload is encoded (either using Reed Muller codes or Polar codes, depending on the payload), mapped to modulation symbols (typically Quadrature Phase Shift Keying (QPSK) or pi/2 Binary Phase Shift Keying (BPSK)), Discrete Fourier Transform (DFT)-precoded to reduce Peak to Average Power Ratio (PAPR), and mapped to allocated subcarriers for orthogonal frequency division multiplexing (OFDM) transmission.

A UE can be configured with multiple PUCCH formats, of the same or different type. Small payload PUCCH formats are needed if a UE is scheduled only with 1 or 2 DL assignments while a large payload format is needed if the UE is scheduled with multiple DL assignments. Long PUCCH formats are also needed for better coverage. A UE could for example be configured with a short PUCCH for ≤2 bit and a long PUCCH for >2 bit. A UE in very good coverage could even use a short PUCCH format for >2 bit while a UE in less good coverage requires even for ≤2 bit a long PUCCH format. FIG. 2 illustrates a UE being configured with multiple long and short PUCCH formats.

NR supports dynamic indication of PUCCH resource and time. As said above, the HARQ codebook carried by PUCCH can contain HARQ feedback from multiple PDSCH (from multiple time instances and/or component carriers). PUCCH resource and time will be indicated in the scheduling DL assignment in case of a dynamic scheduled transmission. The association between PDSCH and PUCCH can be based on the PUCCH resource (PR) and time indicated in the scheduling DCI (ΔT). HARQ feedback of all PDSCHs, for which scheduling DCIs indicate same PUCCH resource and time, are reported together in the same HARQ codebook. The latest PDSCH that can be included is limited by the processing time the UE needs to prepare HARQ feedback.

FIG. 3 illustrates HARQ feedback association. As depicted, the UE can report HARQ feedback on a short PUCCH in the same slot. The earliest PDSCH to include in the HARQ codebook for a given PUCCH resource is the first scheduled PDSCH after the time window of the last transmitted same PUCCH resource has been expired. In the particular example of FIG. 3, PDSCH of slot n-1 is reported on PUCCH resource m of slot n-1. PDSCH from slot n is therefore the first PDSCH to include in the HARQ codebook transmitted on PUCCH resource m in slot n+4.

To avoid wrong HARQ codebook sizes and wrong indexing into the HARQ codebook, a DAI is included in each DL assignment that counts DL assignments up to (and including) the current DL assignment. In case of carrier aggregation, a counter and total DAI are needed as discussed above. However, FIG. 3 depicts the case without carrier aggregation.

There currently exist certain challenge(s). For example, the HARQ codebook can be determined if one or few DL assignments are lost. The exact number how many DL assignments can be lost depends on how the lost assignments are placed relative to each other. For example, the number of consecutively lost DL assignments is limited by the possible DAI range and also by whether the DCI contains a single DAI or multiple DAI (carrier aggregation).

However, in case the UE misses the last DL assignment with the latest DAI (latest total DAI for carrier aggregation), the UE is not aware to the missed assignment and determines the HARQ codebook too small.

SUMMARY

To address the foregoing problems with existing solutions, disclosed is systems and methods for transmitting and receiving Hybrid Automatic Repeat Request (HARQ) feedback. Specifically, information contained in the downlink (DL) assignment may identify the Physical Uplink Control Channel (PUCCH) resource that should be used to provide HARQ feedback. For example, the information in the DL assignment may identify the PUCCH timing indicator and PUCCH or Acknowledgment/Not-Acknowledgment (ACK/NACK) resource indicator (ART). In a particular embodiment, the configuration of the identified PUCCH resource may also contain the Hybrid Automatic Repeat Request (HARQ) codebook size.

According to certain embodiments, a method by a wireless device for transmitting HARQ feedback includes obtaining a PUCCH configuration parameter comprising a channel code type. Based on the PUCCH configuration parameter comprising the channel code type, a PUCCH format is selected for transmitting the HARQ feedback to a network node on the PUCCH, and the HARQ feedback is transmitted to the network node.

According to certain embodiments, a wireless device for transmitting HARQ feedback includes memory storing instructions and processing circuitry operable to execute the instructions to cause the wireless device to obtain a PUCCH configuration parameter comprising a channel code type. Based on the PUCCH configuration parameter comprising the channel code type, a PUCCH format is selected for transmitting the HARQ feedback to a network node on the PUCCH, and the HARQ feedback is transmitted to the network node.

According to certain embodiments, a method by a network node for receiving HARQ feedback includes transmitting, to a wireless device, a PUCCH configuration parameter comprising a channel code type and receiving, on the PUCCH, the HARQ feedback formatted based on at least the channel code type.

According to certain embodiments, a network node for receiving HARQ feedback includes memory storing instructions and processing circuitry operable to execute the instructions to cause the network node to transmit, to a wireless device, a PUCCH configuration parameter comprising a channel code type and receive, on the PUCCH, the HARQ feedback formatted based on at least the channel code type.

Certain embodiments may provide one or more of the following technical advantage(s). For example, certain embodiments may avoid error cases that occur when a user equipment (UE) misses the last downlink (DL) assignment with the highest total Downlink Assignment Index (DAI).

Certain embodiments may include none, some, or all of these advantages. Certain embodiments may include other advantages, as would be understood by a person having ordinary skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
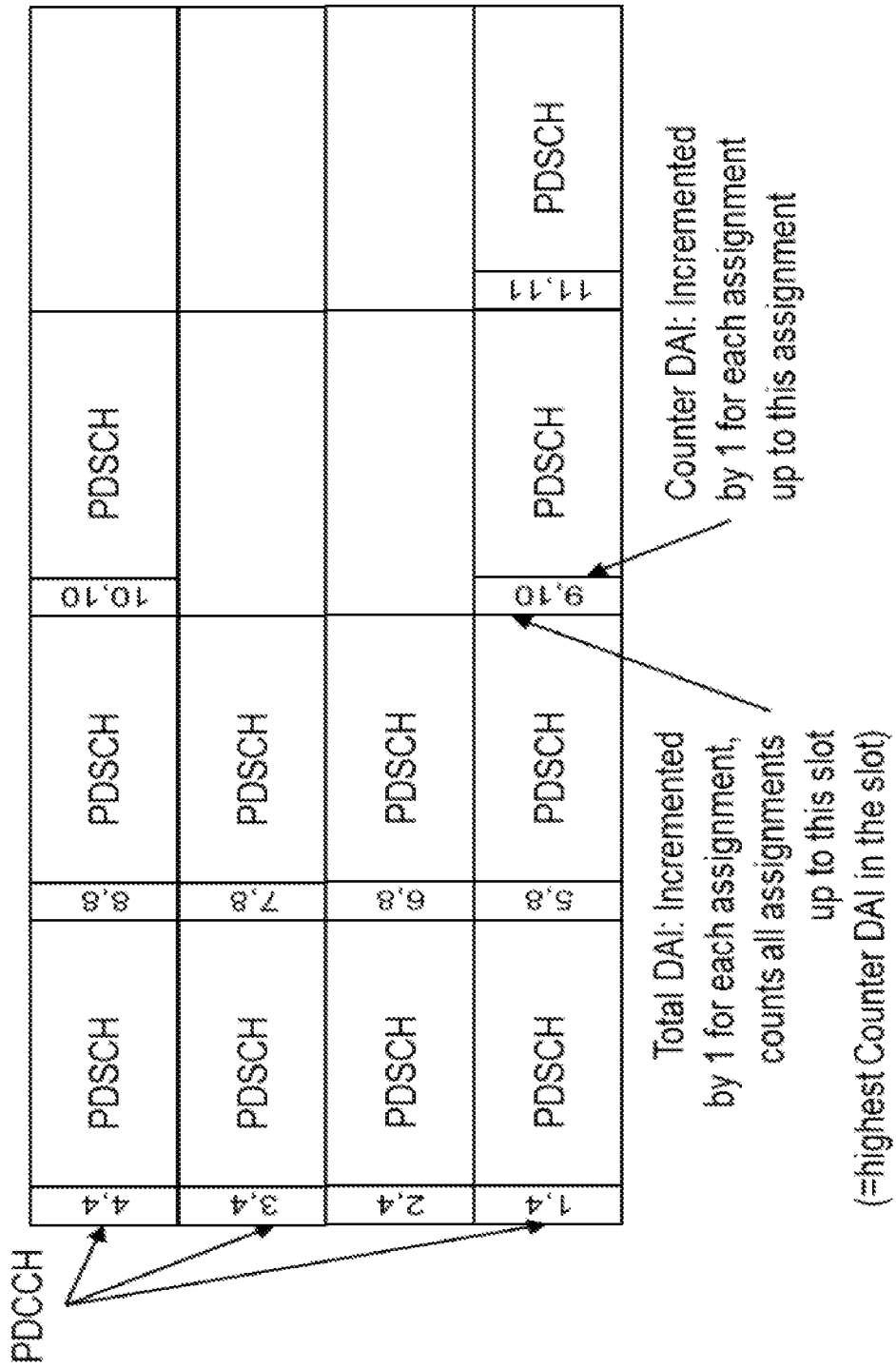
FIG. 1 illustrates an example of a counter and total downlink assignment index (DAI)
Figure 2:
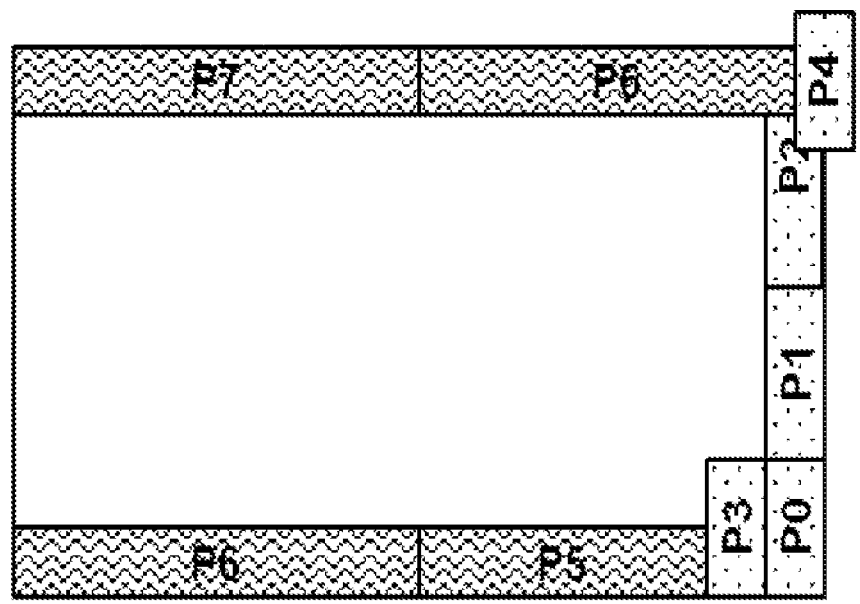
FIG. 2 illustrates an example of a UE configured with multiple long and short physical uplink control channel (PUCCH) formats.
Figure 3:
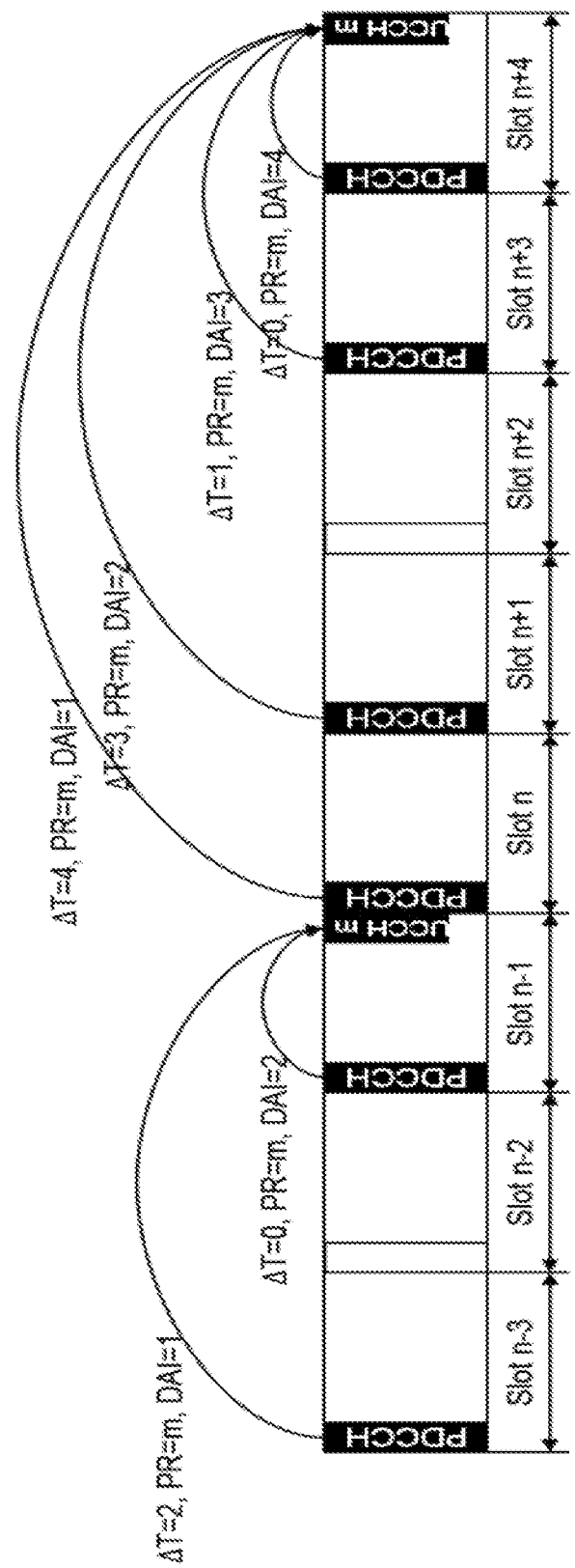
FIG. 3 illustrates an example hybrid automatic repeat request (HARQ) feedback association.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

To address the foregoing problems with existing solutions, disclosed is systems and methods for transmitting and receiving Hybrid Automatic Repeat Request (HARQ) feedback. Specifically, information contained in a downlink (DL) assignment from a network node may identify the Physical Uplink Control Channel (PUCCH) resource that should be used to provide HARQ feedback. For example, the information in the DL assignment may identify the PUCCH timing indicator and PUCCH or Acknowledgment/Not-Acknowledgment (ACK/NACK) resource indicator (ARI). In a particular embodiment, the configuration of the identified PUCCH resource may also contain the Hybrid Automatic Repeat Request (HARQ) codebook size.

According to certain embodiments, for example, a method is provided for determining HAM) codebook size in a wireless device. The method may include detecting, by the wireless device, a downlink assignment comprising at least one PUCCH configuration parameter and a codebook size parameter. Based on the codebook size parameter, the wireless device may determine a size of a codebook to be used in transmitting feedback to a network node on the PUCCH. The size of the codebook may be used to generate the feedback to be transmitted to the network node on the PUCCH, and the feedback may be transmitted to the network node.

According to certain embodiments, for example, a wireless device is provided for determining HARQ codebook size that includes a memory storing instructions and processing circuitry operable to execute the instructions to cause the wireless device to detect a downlink assignment comprising at least one PUCCH configuration parameter and a codebook size parameter. Based on the codebook size parameter, the wireless device may determine a size of a codebook to be used in transmitting feedback to a network node on the PUCCH. The size of the codebook may be used to generate the feedback to be transmitted to the network node on the PUCCH, and the feedback may be transmitted to the network node.

According to certain embodiments, for example, a method by a network node is provided for determining HARQ codebook size that includes determining a codebook size parameter to be used by a wireless device in determining a size of a codebook for providing feedback to the network node. A downlink assignment is transmitted to the wireless device. The downlink assignment includes at least one PUCCH configuration parameter and the codebook size parameter. Feedback that is formatted based on at least the codebook size parameter is received on the PUCCH.

According to certain embodiments, for example, network node is provided for determining HARQ codebook size that includes a memory storing instructions and processing circuitry operable to execute the instructions to cause the receiver to determine a codebook size parameter to be used by a wireless device in determining a size of a codebook for providing feedback to the network node. A downlink assignment is transmitted to the wireless device. The downlink assignment includes at least one PUCCH configuration parameter and the codebook size parameter. Feedback that is formatted based on at least the codebook size parameter is received on the PUCCH.

According to certain embodiments, the HARQ codebook to be used on a PUCCH resource is configured as part of the PUCCH configuration. Thus, in addition to the PUCCH configuration parameters (time, frequency, codes, etc.) that are usually included in the information in the DL assignment, the PUCCH configuration may contain a parameter that may be used to determine the HARQ codebook size that should be used together with the current PUCCH resource. In a particular embodiment, for example, the parameter may be the HARQ codebook size itself. In another example embodiment, the parameter may be a parameter that, together with some other parameters, may be used to determine the HARQ codebook size.

According to certain embodiments particular to long PUCCH, a user equipment (UE) uses either BPSK or QPSK modulation alphabet. A long PUCCH format for ≤2 bit may be configured for 2 bit, and the UE may only use one dimension of QPSK to modulate with 1-bit feedback. The UE may set the other dimension to a fixed value. For example, the UE may set the other dimension to a NACK. The resulting constellation diagram is, however, no longer a Grey mapping.

In an alternative embodiment, a UE may use QPSK Grey mapping. However, where the UE only has 1 bit feedback, the signal space distance between the code points may not be maximized. To avoid this drawback, a ≤2 bit PUCCH resource may be configured to carry either 1 or 2 bit, according to a particular embodiment. Short PUCCH for ≤2 bit is based on sequence selection, but, even here, performance and/or multiplexing capacity can be increased when configuring the PUCCH resource either with 1 or 2 bit.

PUCCH formats supporting >2 bit (both short and long PUCCH) can in principle support a range of payload sizes for a given Physical Resource Block (PRB) configuration. But, if the payload size increases too much, additional PRB(s) may be added to maintain a reasonable PUCCH code rate. However, according to certain embodiments disclosed herein, there is no payload variability. A given PUCCH resource—despite that its physical layer structure supports variable payload—is configured together with a fixed HARQ codebook size. If a UE receives fewer DL assignments than the HARQ codebook can carry, the UE sets bits corresponding to not received assignments to a fixed value, typically NACK. It should be noted that due to Multiple-Input Multiple-Output (MIMO) and Code Book Group (CBG) configuration, one DL assignment can correspond to more than one bit in the HARQ codebook.

In NR, Uplink Control Information (UCI) is encoded using Reed Muller codes up to 11 bit and Polar codes for larger UCI sizes. To avoid blind determination of channel code type, the PUCCH configuration may also include a channel code type. For example, in NR, if the configured HARQ codebook size is ≤11 bit, Reed Muller encoding is used. However, for larger UCI sizes, polar encoding may be used. Using this rule, a PUCCH resource configuration does not need to contain an explicit channel coding configuration. Rather, according to certain embodiments, the existing NR coding rule is used with the exception that the configured HARQ codebook size and not the actual UCI size determines the channel code. In other embodiments, the PUCCH resource may be explicitly configured with a channel code that is used for the HARQ codebook. In still other embodiments, another alternative is to configure either the implicit determination based on configured HARQ codebook size or explicitly a channel code.

In LTE PUCCH Format 3, the HARQ codebook size is either fixed to 11 or 21. The selection between 11 or 21 is not configured as part of the PUCCH configuration but depends on the number of configured component carriers, the uplink-downlink configuration, as well as on the subframe within which PUCCH is transmitted.

Figure 4:
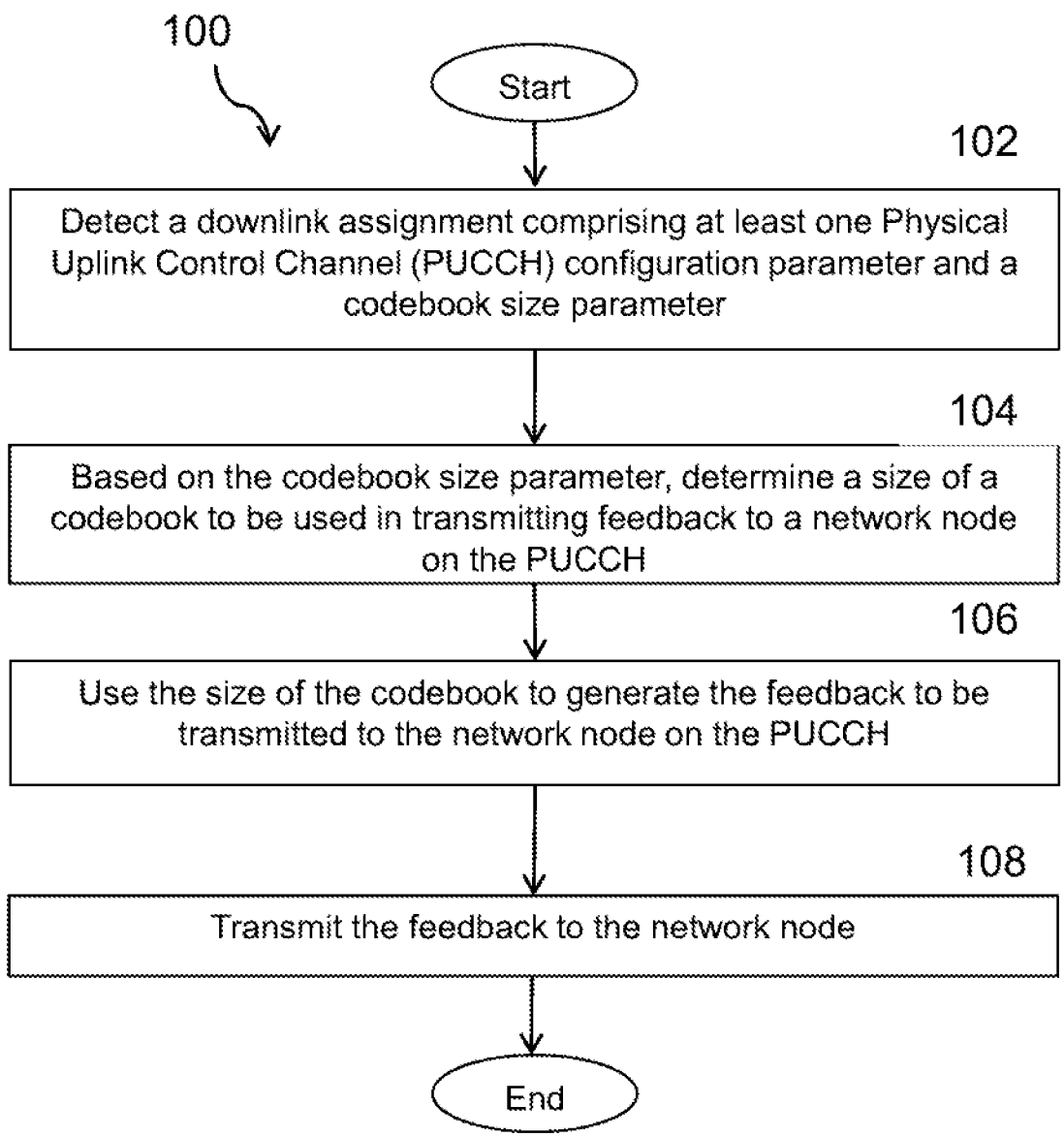
FIG. 4 illustrates an example method by a UE for determining HARQ codebook size, according to certain embodiments.

FIG. 4 illustrates an example method 100 by a wireless device for determining HARQ codebook size, according to certain embodiments. In a particular embodiment, the wireless device may include a UE.

The method begins, at step 102, when the UE detects a DL assignment on a component carrier. According to certain embodiments, the DL assignment includes at least one PUCCH configuration parameter and a codebook size parameter.

At step 104, the UE determines, based on the codebook size parameter, a size of a codebook to be used in transmitting feedback to a network node on the PUCCH. In a particular embodiment, the codebook size parameter explicitly identifies the size of the codebook to be used in transmitting feedback to the network node. In another embodiment, the UE may determine the size of the codebook based on the code size parameter and at least one additional parameter.

At step 106, the UE uses the size of the codebook to generate the feedback to be transmitted to the network node on the PUCCH.

At step 108, the UE transmits the feedback to the network node. In a particular embodiment, the UE may receive fewer DL assignments than the codebook can carry, and the UE may set any bits corresponding to not received DL assignments to a fixed value such as, for example, a NACK.

In a particular embodiment, the PUCCH configuration includes a channel code type, and, the UE may use Reed Muller encoding if the codebook size is less than or equal to 11 bits and Polar encoding if the codebook size is greater than 11.

In another embodiment, the PUCCH configuration may not include an explicit channel coding configuration. The UE may determine the channel code by using an existing coding rule based on the configured codebook size rather than an actual UCI size.

In still another embodiment, the PUCCH configuration may include a PUCCH resource that is explicitly configured with a channel code, and the UE may determine the codebook size based on the channel code.

Certain embodiments may comprise more or fewer actions, and the actions may be performed in any suitable order.

Figure 5:
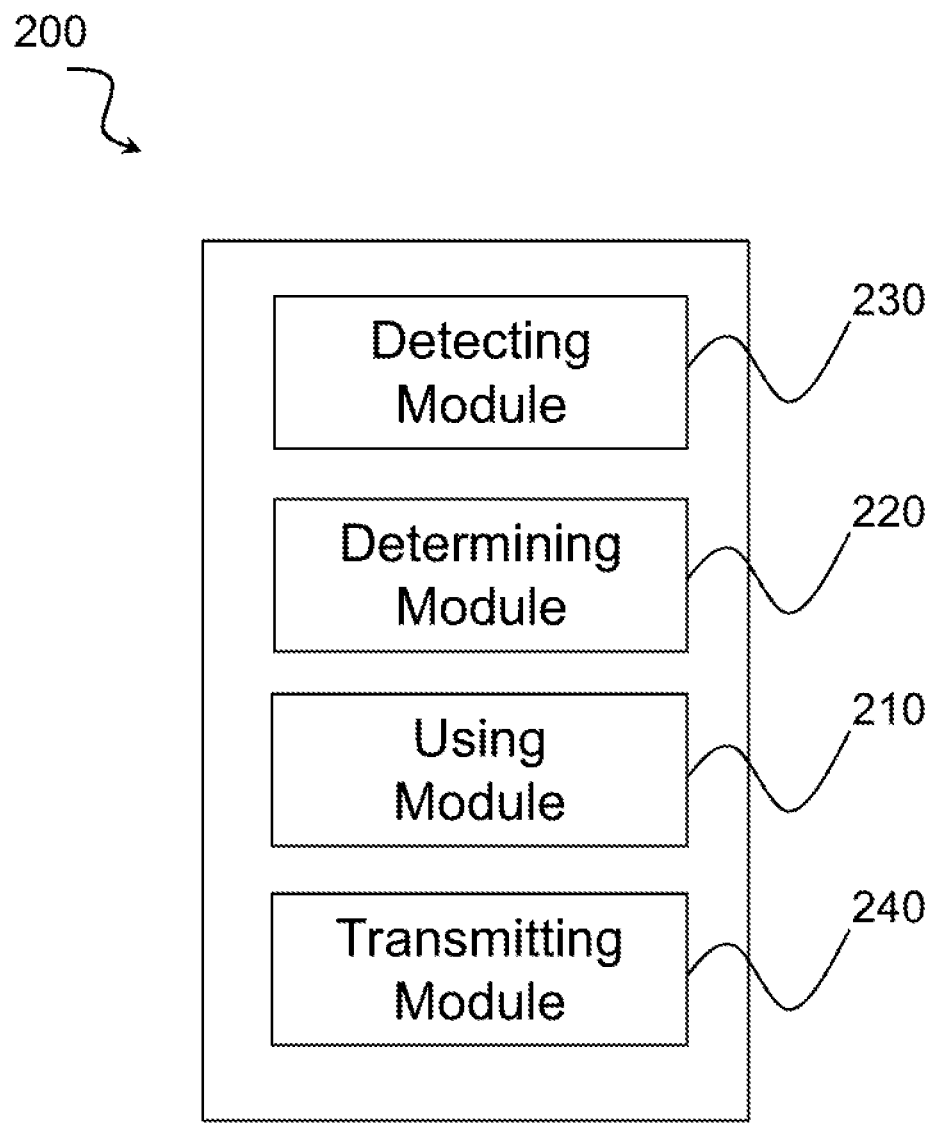
FIG. 5 illustrates an example virtual computing device for determining HARQ codebook size, according to certain embodiments.

In certain embodiments, the method for determining HARQ codebook size may be performed by a virtual computing device. FIG. 5 illustrates an example virtual computing device 200 for determining HARQ codebook size, according to certain embodiments. In certain embodiments, virtual computing device 200 may include modules for performing steps similar to those described above with regard to the method illustrated and described in FIG. 4. For example, virtual computing device 200 may include a detecting module 210, a determining module 220, a using module 230, a transmitting module 240, and any other suitable modules for determining HARQ codebook size. In some embodiments, one or more of the modules may be implemented using processing circuitry 1020 of FIG. 13. In certain embodiments, the functions of two or more of the various modules may be combined into a single module.

The detecting module 210 may perform certain of the detecting functions of virtual computing device 200. For example, in a particular embodiment, detecting module 210 may detect a DL assignment on a component carrier. According to certain embodiments, the DL assignment includes at least one PUCCH configuration parameter and a codebook size parameter.

The determining module 220 may perform certain of the determining functions of virtual computing device 200. For example, in a particular embodiment, determining module 220 may determine, based on the codebook size parameter, a size of a codebook to be used in transmitting feedback to a network node on the PUCCH.

The using module 230 may perform certain of the using functions of virtual computing device 200. For example, in a particular embodiment, using module 230 may use the size of the codebook to generate the feedback to be transmitted to the network node on the PUCCH.

The transmitting module 240 may perform certain of the transmitting functions of virtual computing device 200. For example, in a particular embodiment, transmitting module 240 may transmit the feedback to the network node on the PUCCH.

Other embodiments of virtual computing device 200 may include additional components beyond those shown in FIG. 5 that may be responsible for providing certain aspects of the wireless device's functionality, including any of the functionality described above and/or any additional functionality (including any functionality necessary to support the solutions described above). The various different types of user equipments or other wireless devices may include components having the same physical hardware but configured (e.g., via programming) to support different radio access technologies, or may represent partly or entirely different physical components.

Figure 6:
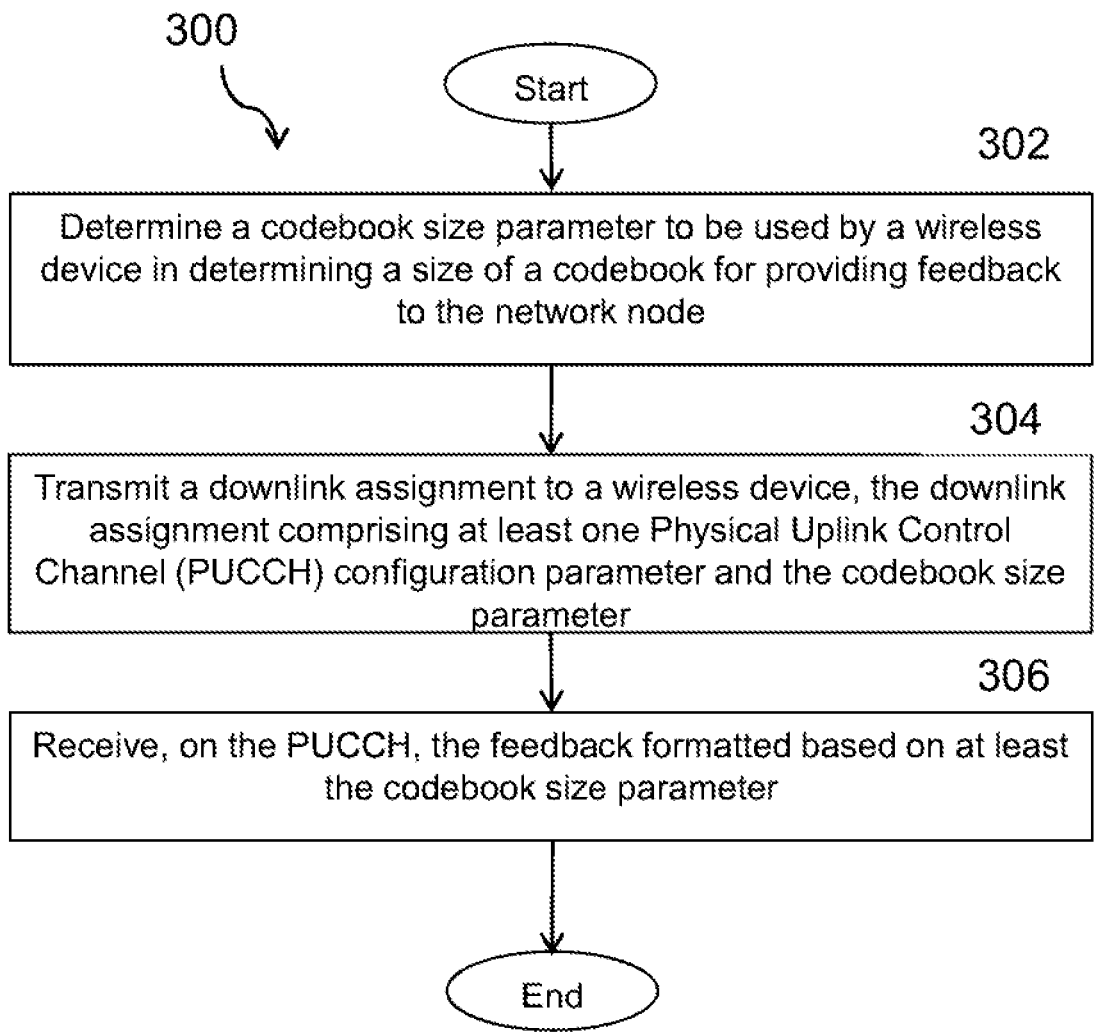
FIG. 6 illustrates an example method by a network node for determining HARQ codebook size, according to certain embodiments.

FIG. 6 illustrates an example method 300 by a network node for determining HARQ codebook size, according to certain embodiments. The method begins at step 302 when the network node determines a codebook size parameter to be used by a UE in determining a size of a codebook for providing feedback to the network node. In a particular embodiment, the codebook size parameter explicitly identifies the size of the codebook to be used in transmitting feedback to the network node. In another embodiment, the UE may be configured to determine the size of the codebook based one the code size parameter and at least one additional parameter.

At step 304, the network node transmits a DL assignment to the UE, The DL assignment may include at least one PUCCH configuration parameter and the codebook size parameter.

At step 306, the network node receives, on the PUCCH, the feedback formatted based on at least the codebook size parameter. In a particular embodiment, the network node may transmit fewer DL assignments than the codebook can carry and a NACK may be received in any bits corresponding to not received DL assignments.

In a particular embodiment, the PUCCH configuration includes a channel code type, and the feedback may be encoded using Reed Muller encoding if the codebook size is less than or equal to 11 bits and Polar encoding if the codebook size is greater than 11.

In another embodiment, the PUCCH configuration may not include an explicit channel coding configuration. The network node may configure the UE to determine the channel code by using an existing coding rule based on the configured codebook size rather than an actual UCI size.

In still another embodiment, the PUCCH configuration may include a PUCCH resource that is explicitly configured with a channel code, and the network node may configure the UE to determine the codebook size based on the channel code.

Certain embodiments may comprise more or fewer actions, and the actions may be performed in any suitable order.

Figure 7:
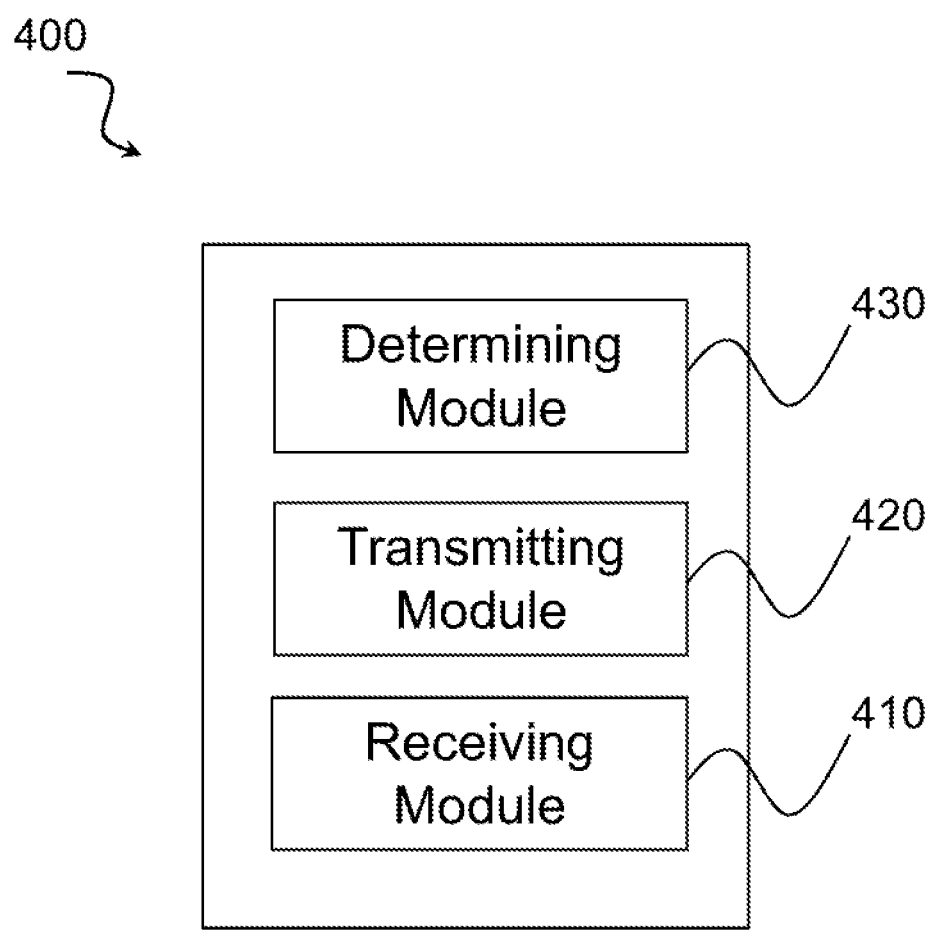
FIG. 7 illustrates an example virtual computing device for determining HARQ codebook size, according to certain embodiments.

In certain embodiments, the method for determining HARQ codebook size, as described above may be performed by a virtual computing device. FIG. 7 illustrates an example virtual computing device 400 for determining HARQ codebook size, according to certain embodiments. In certain embodiments, virtual computing device 400 may include modules for performing steps similar to those described above with regard to the method illustrated and described in FIG. 6. For example, virtual computing device 400 may include a determining module 410, a transmitting module 420, a receiving module 430, and any other suitable modules for determining HARQ codebook size. In some embodiments, one or more of the modules may be implemented using processing circuitry 1120 of FIG. 14. In certain embodiments, the functions of two or more of the various modules may be combined into a single module.

The determining module 410 may perform certain of the determining functions of virtual computing device 400. For example, in a particular embodiment, determining module 420 may determine a codebook size parameter to be used by a UE in determining a size of a codebook for providing feedback to the network node. In a particular embodiment, the codebook size parameter explicitly identifies the size of the codebook to be used in transmitting feedback to the network node. In another embodiment, the size of the codebook may be determined based on the code size parameter and at least one additional parameter.

The transmitting module 420 may perform certain of the transmitting functions of virtual computing device 400. For example, in a particular embodiment, transmitting module 420 may transmit a DL assignment to the UE. The DL assignment may include at least one PUCCH configuration parameter and the codebook size parameter.

The receiving module 430 may perform certain of the receiving functions of virtual computing device 400. For example, in a particular embodiment, receiving module 430 may receive, on the PUCCH the feedback formatted based on at least the codebook size parameter.

Other embodiments of virtual computing device 400 may include additional components beyond those shown in FIG. 7 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
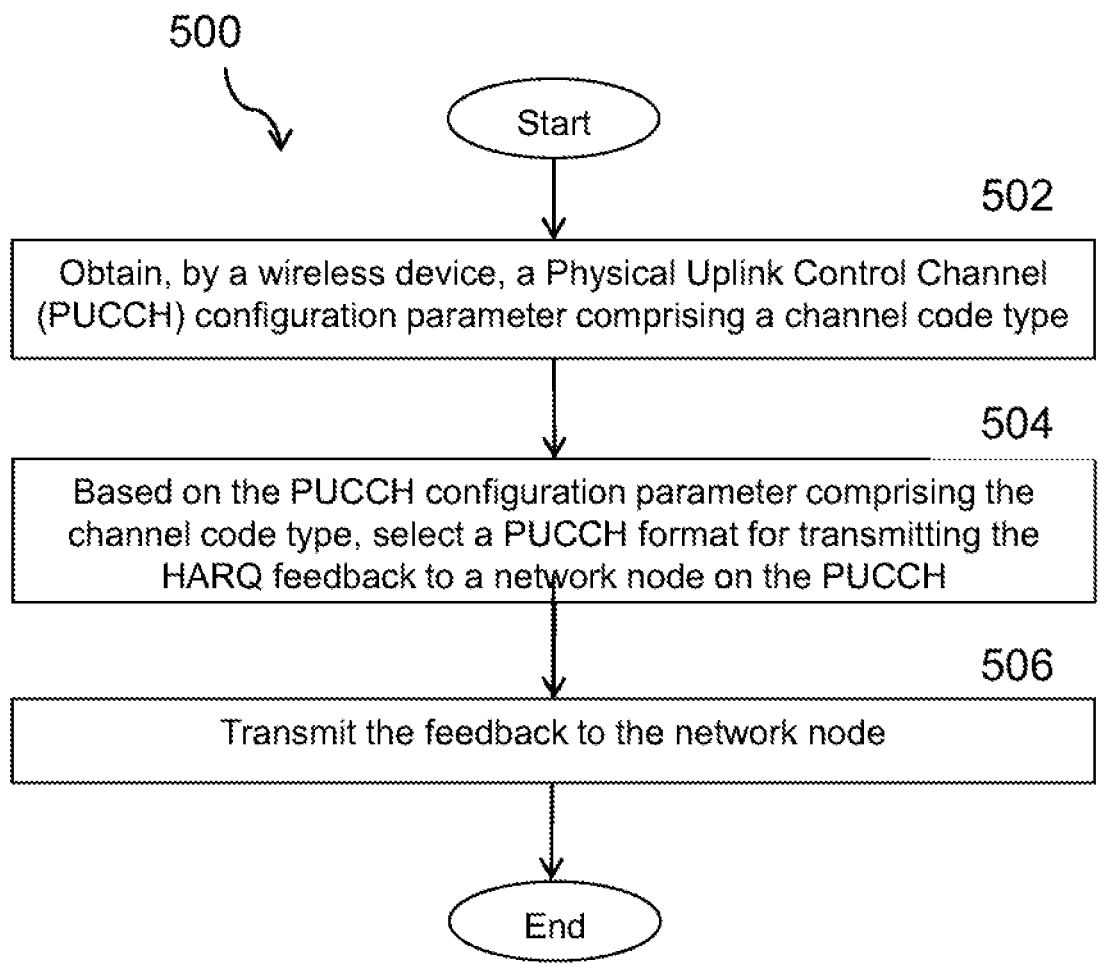
FIG. 8 illustrates an example method by a wireless device for transmitting HARQ feedback, according to certain embodiments.

FIG. 8 illustrates an example method by a wireless device for transmitting HARQ feedback, according to certain embodiments. In a particular embodiment, the wireless device is a UE.

At step 502, the method begins when the wireless device obtains a PUCCH configuration parameter comprising a channel code type. In a particular embodiment, the PUCCH configuration parameter is received as a DL assignment from a network node. In another particular embodiment, the PUCCH configuration parameter may be received via RRC signaling from a network node.

Based on the PUCCH configuration parameter comprising the channel code type, the wireless device selects a PUCCH format for transmitting the HARQ feedback to a network node on the PUCCH, at step 504.

At step 506, the wireless device transmits the HARQ feedback to the network node.

In a particular embodiment, the HARQ feedback is transmitted using a ≤2 bit PUCCH resource. In a further particular embodiment, only one bit of the ≤2 bit PUCCH resource comprises the HARQ feedback, and any additional bit of the ≤2 bit PUCCH resource is set to a fixed value.

In another particular embodiment, the HARQ feedback is transmitted using >2 bit PUCCH resource. Where the wireless device receives fewer DL assignments than the codebook can carry, the method further comprises setting, by the wireless device, any bits corresponding to not received DL assignments to a fixed value. For example, the fixed value may be a Not-acknowledgment (NACK), in a particular embodiment.

In a particular embodiment, the PUCCH configuration parameter may further include a codebook size parameter, and the wireless device may select a codebook at least partially based on the codebook size parameter. In a further particular embodiment, the codebook size parameter identifies the size of the codebook to be used in transmitting the HARQ feedback to the network node. In another particular embodiment, if the codebook size is less than or equal to 11 bits, Reed Muller encoding may be used to encode the HARQ feedback. However, if the codebook size is greater than 11, Polar encoding may be used to encode the HARQ feedback.

In a particular embodiment, the PUCCH configuration may include a PUCCH resource that is explicitly configured with the channel code type, and the wireless device may determine a codebook size based on the channel code type.

Certain embodiments may comprise more or fewer actions, and the actions may be performed in any suitable order.

Figure 9:
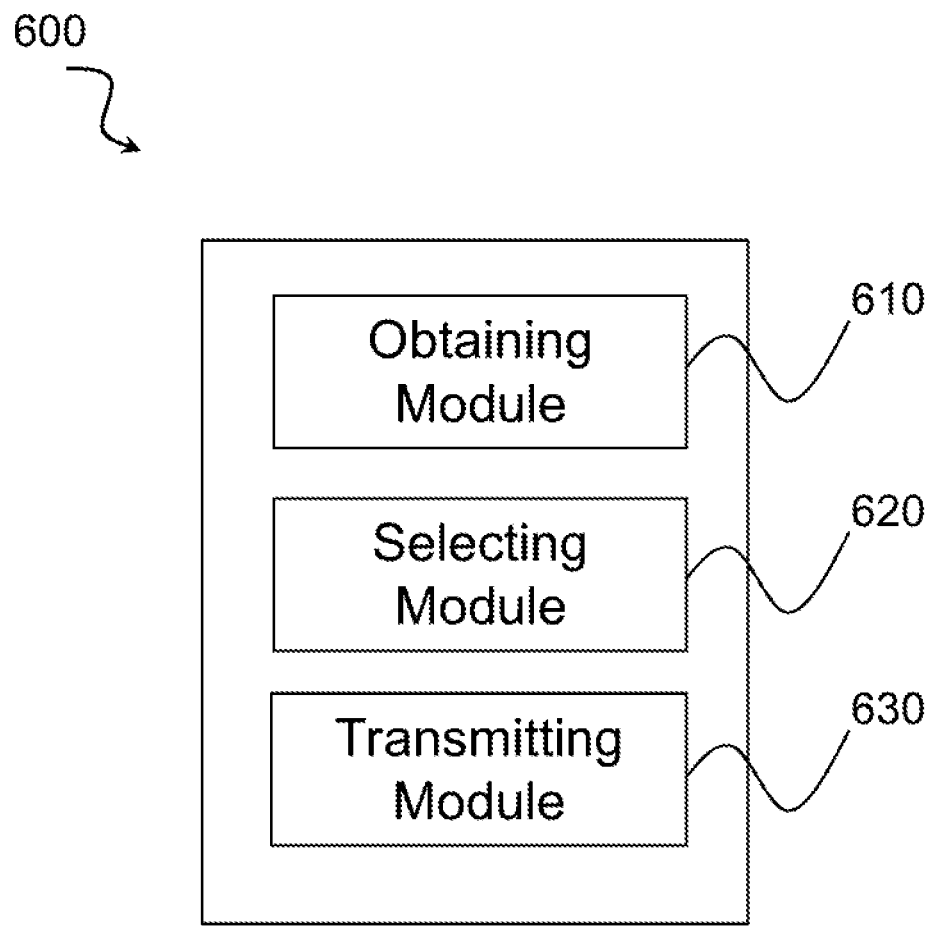
FIG. 9 illustrates an example method by a wireless device for transmitting HARQ feedback, according to certain embodiments.

In certain embodiments, the method for transmitting HARQ feedback may be performed by a virtual computing device. FIG. 9 illustrates an example virtual computing device 600 for transmitting HARQ feedback, according to certain embodiments. In certain embodiments, virtual computing device 600 may include modules for performing steps similar to those described above with regard to the method illustrated and described in FIG. 8. For example, virtual computing device 600 may include an obtaining module 610, a selecting module 620, a transmitting module 630, and any other suitable modules for transmitting HARQ feedback. In some embodiments, one or more of the modules may be implemented using processing circuitry 1020 of FIG. 13. In certain embodiments, the functions of two or more of the various modules may be combined into a single module.

The obtaining module 610 may perform the obtaining functions of virtual computing device 600. For example, in a particular embodiment, obtaining module 610 may obtain a PUCCH configuration parameter comprising a channel code type.

The selecting module 620 may perform the selecting functions of virtual computing device 600. For example, in a particular embodiment, selecting module 620 may select the wireless device selects a PUCCH format for transmitting the HARQ feedback to a network node on the PUCCH based on the PUCCH configuration parameter comprising the channel code type.

The transmitting module 630 may perform the transmitting functions of virtual computing device 600. For example, in a particular embodiment, transmitting module 630 may transmit the HARQ feedback to the network node.

Other embodiments of virtual computing device 600 may include additional components beyond those shown in FIG. 7 that may be responsible for providing certain aspects of the wireless device's functionality, including any of the functionality described above and/or any additional functionality (including any functionality necessary to support the solutions described above). The various different types of user equipments or other wireless devices may include components having the same physical hardware but configured (e.g., via programming) to support different radio access technologies, or may represent partly or entirely different physical components.

Figure 10:
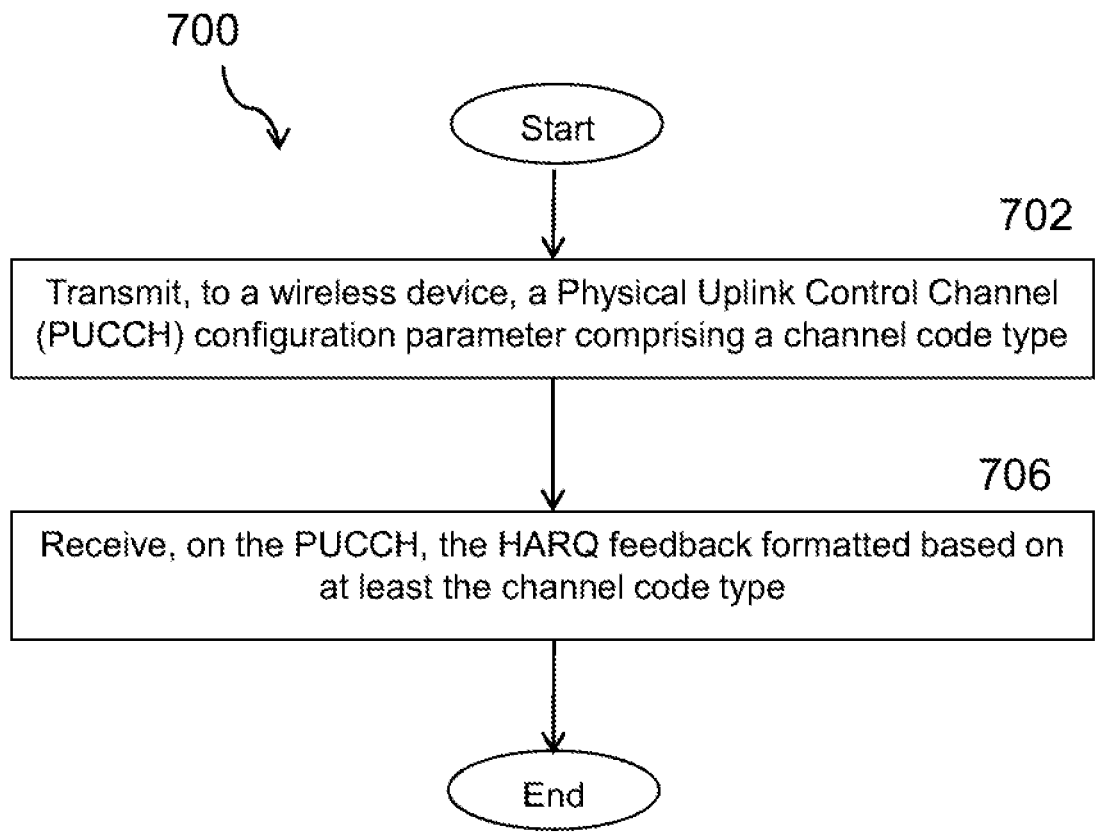
FIG. 10 illustrates an example method by a network node for receiving HARQ feedback, according to certain embodiments.

FIG. 10 illustrates an example method 700 by a network node for receiving HARQ feedback, according to certain embodiments. The method begins at step 702 when the network node transmits a PUCCH configuration parameter comprising a channel code type to a wireless device. In a particular embodiment, the PUCCH configuration parameter is transmitted as a DL assignment. In another particular embodiment, the PUCCH configuration parameter may be transmitted via RRC signaling.

At step 704, the network node receives, on the PUCCH, the HARQ feedback formatted based on at least the channel code type.

In a particular embodiment, the HARQ feedback is received using a ≤2 bit PUCCH resource. In a further particular embodiment, only one bit of the ≤2 bit PUCCH resource comprises the HARQ feedback, and any additional bit of the ≤2 bit PUCCH resource is set to a fixed value. In another embodiment, the HARQ feedback is received using >2 bit PUCCH resource, and any bits corresponding to not received DL assignments have been set to a fixed value by the wireless device. In a further particular embodiment, the fixed value is a Not-acknowledgment (NACK).

In a particular embodiment, the PUCCH configuration parameter further comprises a codebook size parameter for selecting a codebook for the HARQ feedback. The codebook size parameter may identify the size of the codebook to be used by the wireless device in transmitting the HARQ feedback to the network node, in a particular embodiment.

In a particular embodiment, if the codebook size is less than or equal to 11 bits, Reed Muller decoding is used to decode the HARQ feedback. However, if the codebook size is greater than 11, Polar decoding is used to decode the HARQ feedback.

In a particular embodiment, the PUCCH configuration includes a PUCCH resource that is explicitly configured with the channel code type for use by the wireless device in determining a codebook size.

Certain embodiments may comprise more or fewer actions, and the actions may be performed in any suitable order.

Figure 11:
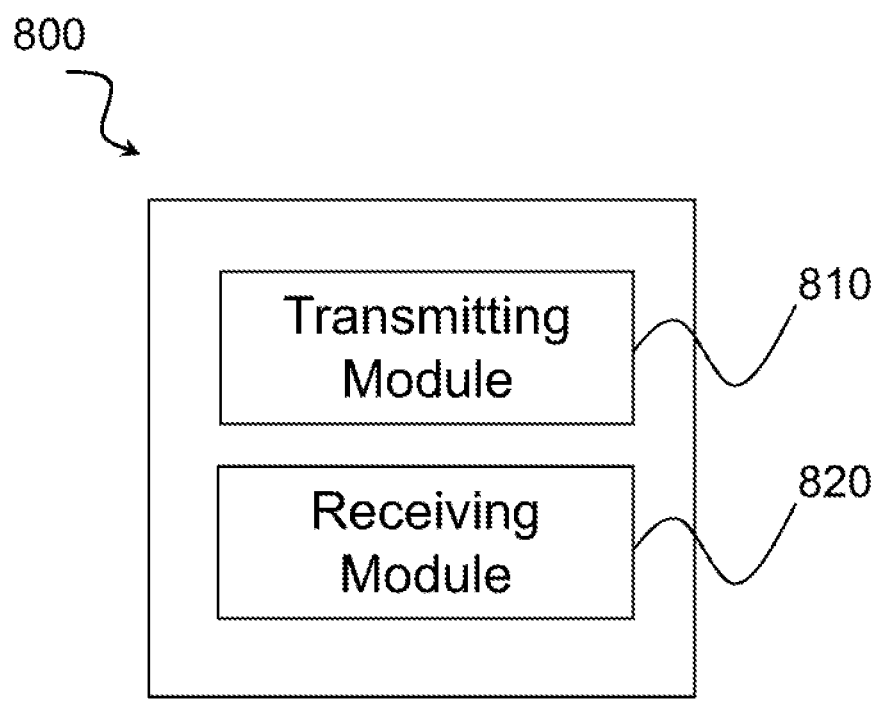
FIG. 11 illustrates an example virtual computing device for receiving HARQ feedback, according to certain embodiments.

In certain embodiments, the method for receiving HARQ feedback, as described above may be performed by a virtual computing device. FIG. 11 illustrates an example virtual computing device 800 for receiving HARQ feedback, according to certain embodiments. In certain embodiments, virtual computing device 800 may include modules for performing steps similar to those described above with regard to the method illustrated and described in FIG. 10. For example, virtual computing device 800 may include a transmitting module 810, a receiving module 820, and any other suitable modules for receiving HARQ feedback. In some embodiments, one or more of the modules may be implemented using processing circuitry 1120 of FIG. 14. In certain embodiments, the functions of two or more of the various modules may be combined into a single module.

The transmitting module 810 may perform certain of the transmitting functions of virtual computing device 800. For example, in a particular embodiment, transmitting module 820 may transmit a PUCCH configuration parameter comprising a channel code type to a wireless device.

The receiving module 820 may perform certain of the receiving functions of virtual computing device 800. For example, in a particular embodiment, receiving module 820 may receive on the PUCCH the HARQ feedback formatted based on at least the channel code type.

Other embodiments of virtual computing device 800 may include additional components beyond those shown in FIG. 11 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
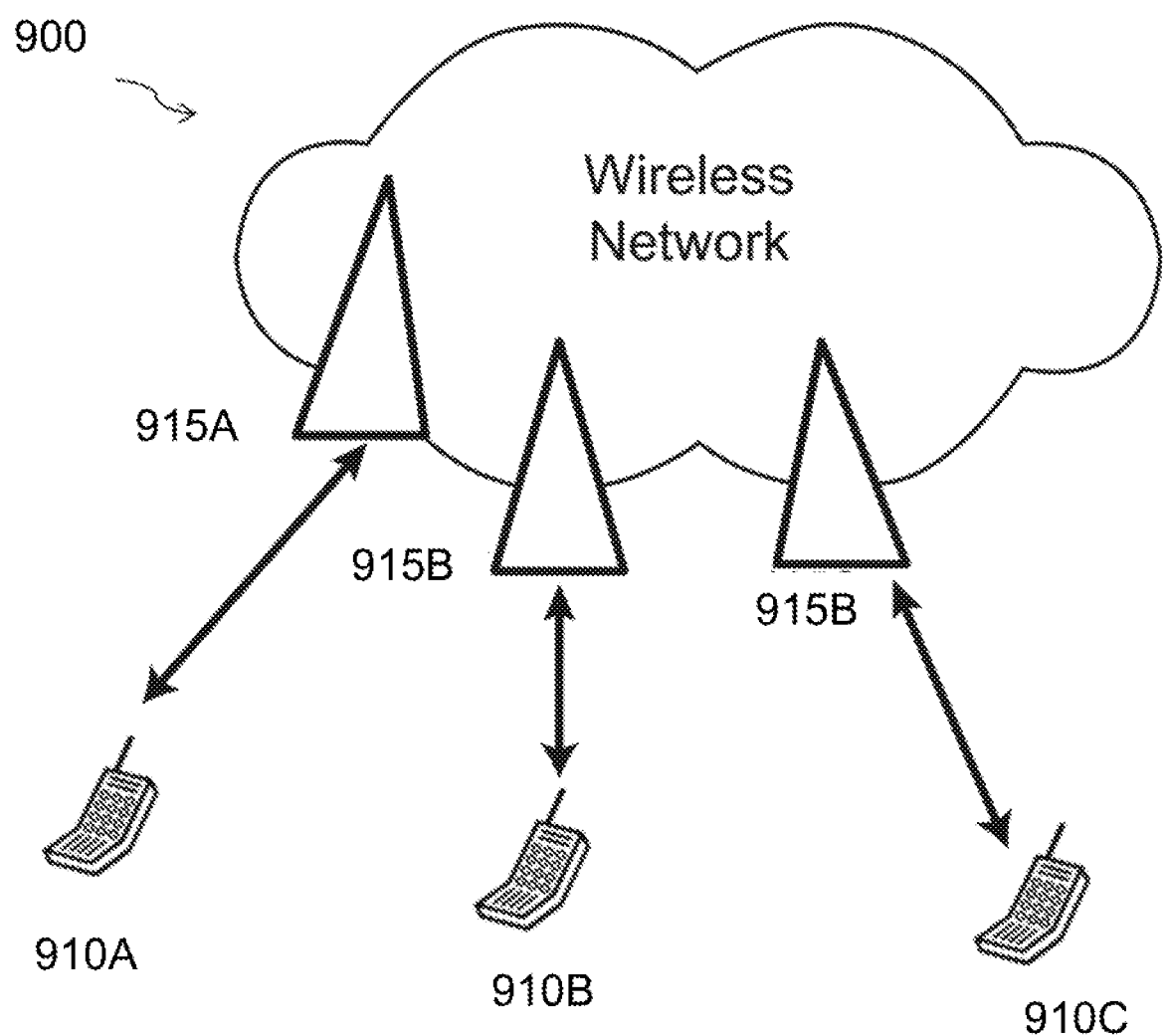
FIG. 12 illustrates an example network, according to certain embodiments.

FIG. 12 is a block diagram illustrating an embodiment of a network 900 in which the methods described above may be used for determining HARQ codebook size, in accordance with certain embodiments. Network 900 includes one or more wireless devices 910A-C, which may be interchangeably referred to as wireless devices 910 or UEs 910, and network nodes 915A-C, which may be interchangeably referred to as network nodes 915 or eNodeBs 915. A wireless device 910 may communicate with network nodes 915 over a wireless interface. For example, wireless device 910A may transmit wireless signals to one or more of network nodes 915, and/or receive wireless signals from one or more of network nodes 915. The wireless signals may contain voice traffic, data traffic, control signals, and/or any other suitable information. In some embodiments, an area of wireless signal coverage associated with a network node 915 may be referred to as a cell. In some embodiments, wireless devices 910 may have D2D capability. Thus, wireless devices 910 may be able to receive signals from and/or transmit signals directly to another wireless device 910. For example, wireless device 910A may be able to receive signals from and/or transmit signals to wireless device 910B.

In certain embodiments, network nodes 915 may interface with a radio network controller (not depicted in FIG. 12). The radio network controller may control network nodes 915 and may provide certain radio resource management functions, mobility management functions, and/or other suitable functions. In certain embodiments, the functions of the radio network controller may be included in network node 915. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 910. Wireless devices 910 may exchange certain signals with the core network node using the non-access stratum layer. In non-access stratum signaling, signals between wireless devices 910 and the core network node may be transparently passed through the radio access network. In certain embodiments, network nodes 915 may interface with one or more network nodes over an internode interface. For example, network nodes 915A and 915B may interface over an X2 interface.

As described above, example embodiments of network 900 may include one or more wireless devices 910, and one or more different types of network nodes capable of communicating (directly or indirectly) with wireless devices 910. Wireless device 910 may refer to any type of wireless device communicating with a node and/or with another wireless device in a cellular or mobile communication system. Examples of wireless device 910 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 910 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 915, wireless devices 910, and other network nodes (such as radio network controller or core network node) are described in more detail with respect to FIGS. 13, 14, and 15, respectively.

Although FIG. 12 illustrates a particular arrangement of network 900, the present disclosure contemplates that the various embodiments described herein may be applied to a variety of networks having any suitable configuration. For example, network 900 may include any suitable number of wireless devices 910 and network nodes 915, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques for determining HARQ codebook size described herein are applicable to both LAA LTE and standalone LTE operation in license-exempt channels. The described techniques are generally applicable for transmissions from both network nodes 915 and wireless devices 910.

Figure 13:
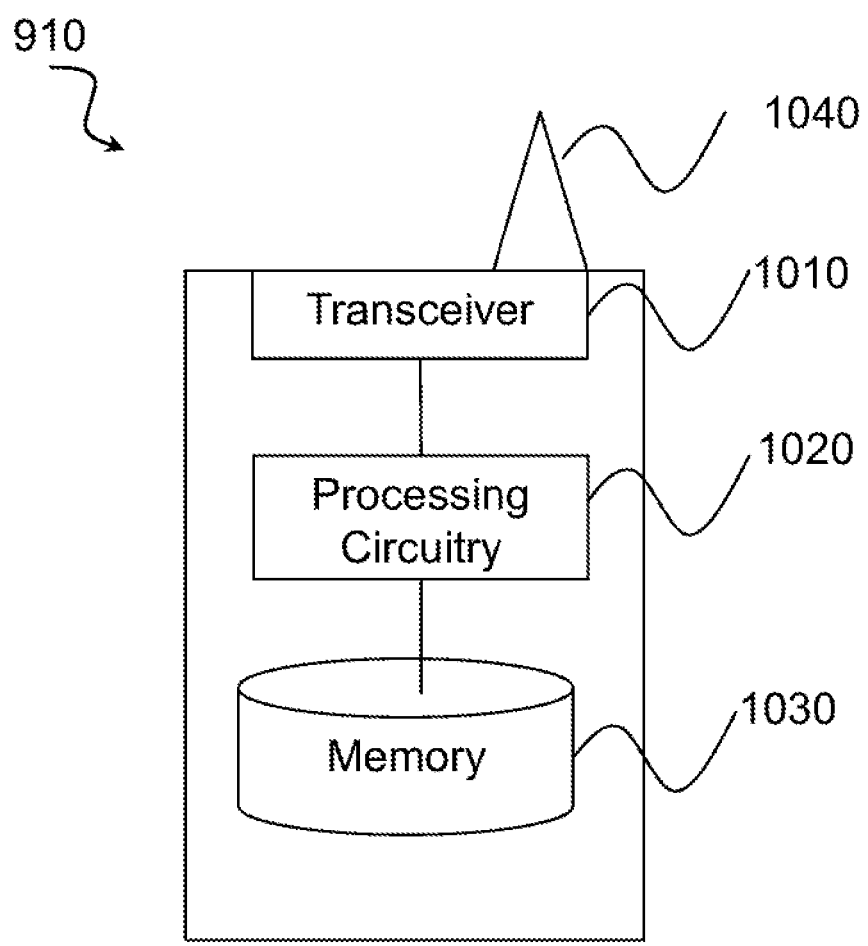
FIG. 13 illustrates an example wireless device, according to certain embodiments.

FIG. 13 is a block schematic of an exemplary wireless device 910 for determining HARQ codebook size, in accordance with certain embodiments. Wireless device 910 may refer to any type of wireless device communicating with a node and/or with another wireless device in a cellular or mobile communication system. Examples of wireless device 910 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 910 may also be referred to as UE, a station (STA), a device, or a terminal in some embodiments. Wireless device 910 includes transceiver 1010, processing circuitry 1020, and memory 1030. In some embodiments, transceiver 1010 facilitates transmitting wireless signals to and receiving wireless signals from network node 915 (e.g., via antenna 1040), processing circuitry 1020 (e.g., which may include one or more processors) executes instructions to provide some or all of the functionality described above as being provided by wireless device 910, and memory 1030 stores the instructions executed by processing circuitry 1020.

Processing circuitry 1020 may include any suitable combination of hardware and software implemented in one or more modules to execute instructions and manipulate data to perform some or all of the described functions of wireless device 910, such as the functions of UE 910 (i.e., wireless device 910) described herein. For example, in general, processing circuitry may detect a DL assignment comprising at least one PUCCH configuration parameter and a codebook size parameter and, based on the codebook size parameter, determine a size of a codebook to be used in transmitting feedback to a network node 915 on the PUCCH. The processing circuitry may also use the size of the codebook to generate the feedback and transmit the feedback to the network node on the PUCCH.

In some embodiments, processing circuitry 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 910 may optionally include additional components beyond those shown in FIG. 13 that may be responsible for providing certain aspects of the wireless device's functionality, including any of the functionality described above and/or any additional functionality (including any functionality necessary to support the solution described above). As just one example, wireless device 910 may include input devices and circuits, output devices, and one or more synchronization units or circuits, which may be part of the processing circuitry 1020. Input devices include mechanisms for entry of data into wireless device 910. For example, input devices may include input mechanisms, such as a microphone, input elements, a display, etc. Output devices may include mechanisms for outputting data in audio, video, and/or hard copy format. For example, output devices may include a speaker, a display, etc.

Figure 14:
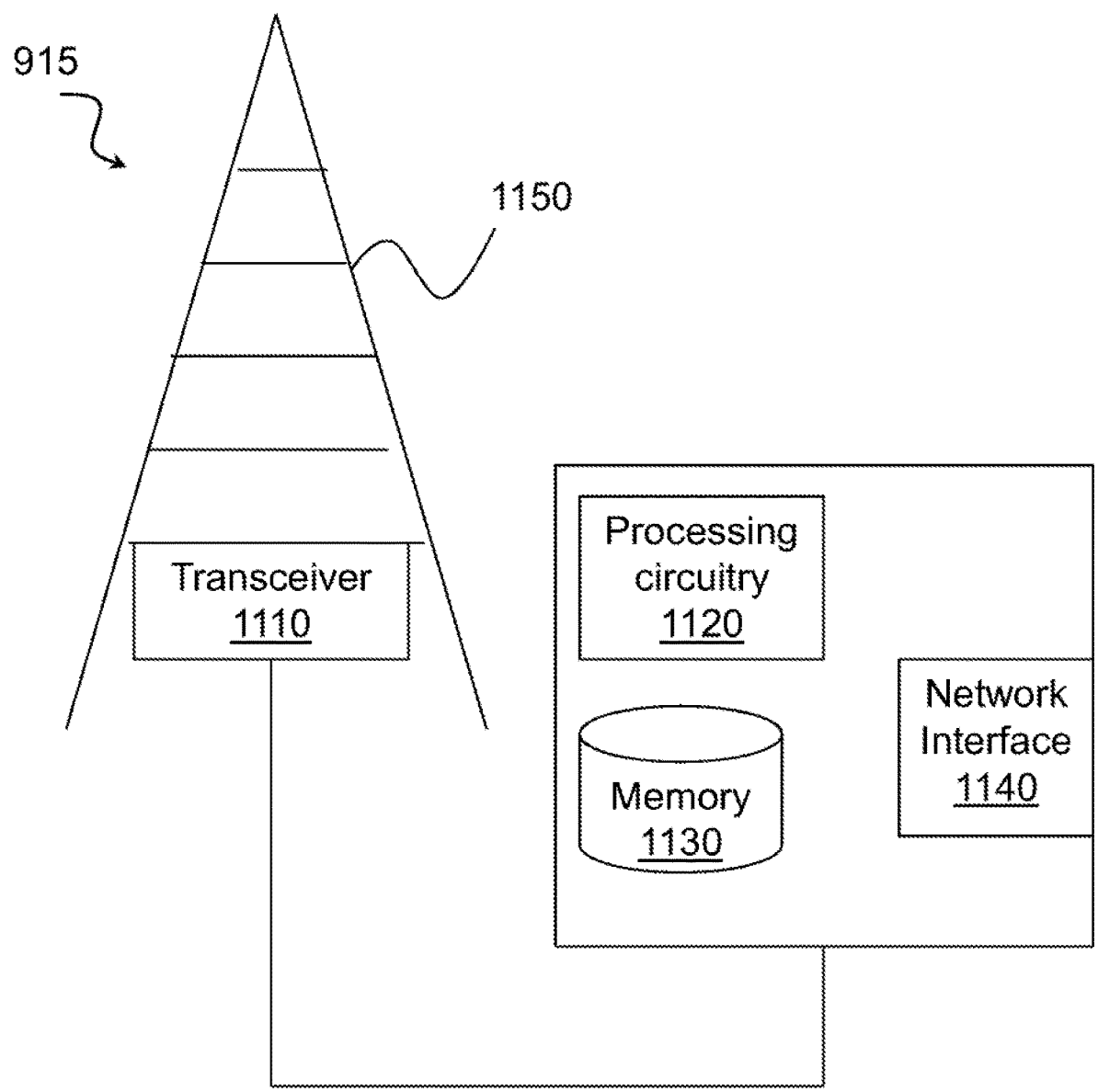
FIG. 14 illustrate an example network node, according to certain embodiments.

FIG. 14 illustrates an example network node 915 for securing network steering information, in accordance with certain embodiments. Network node 915 may be any type of radio network node or any network node that communicates with a UE and/or with another network node. Examples of network node 915 include an gNB, eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 915 may be deployed throughout network 900 as a homogenous deployment, heterogeneous deployment, or mixed deployment. A homogeneous deployment may generally describe a deployment made up of the same (or similar) type of network nodes 915 and/or similar coverage and cell sizes and inter-site distances. A heterogeneous deployment may generally describe deployments using a variety of types of network nodes 915 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 915 may include one or more of transceiver 1110, processing circuitry 1120 (e.g., which may include one or more processors), memory 1130, and network interface 1140. In some embodiments, transceiver 1110 facilitates transmitting wireless signals to and receiving wireless signals from wireless device 910 (e.g., via antenna 1150), processing circuitry 1120 executes instructions to provide some or all of the functionality described above as being provided by a network node 915, memory 1130 stores the instructions executed by processing circuitry 1120, and network interface 1140 communicates signals to backend network components, such as a gateway, switch, router, Internet, Public Switched Telephone Network (PSTN), core network nodes or radio network controllers, etc.

Processing circuitry 1120 may include any suitable combination of hardware and software implemented in one or more modules to execute instructions and manipulate data to perform some or all of the described functions of network node 915, such as those described herein. For example, in general, processing circuitry 1120 may determine a codebook size parameter to be used by a wireless device m determining a size of a codebook for providing feedback to the network node. Processing circuitry 1120 may also transmit, to a wireless device 910, a DL assignment that includes at least one PUCCH configuration parameter and the codebook size parameter. Processing circuitry 1120 may then receive on the PUCCH the feedback formatted based on at least the codebook size parameter.

In some embodiments, processing circuitry 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processing circuitry 1120 and may refer to any suitable device operable to receive input for network node 915, send output from network node 915, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of network node 915 may include additional components beyond those shown in FIG. 14 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 15:
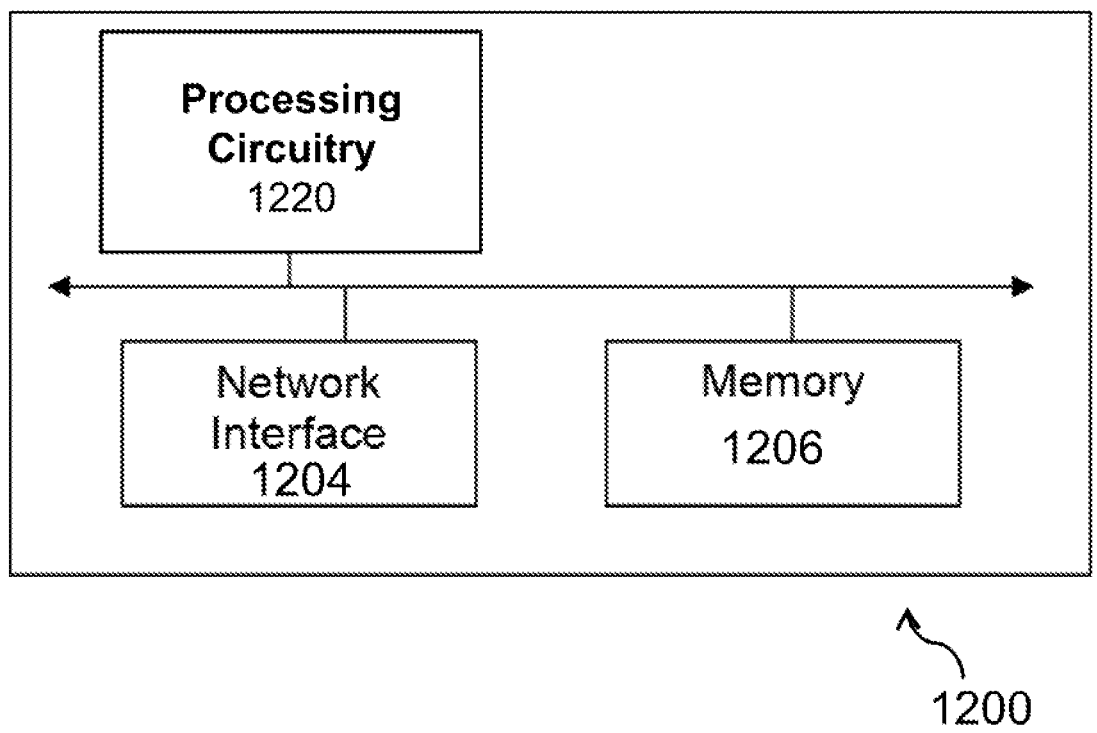
FIG. 15 illustrates illustrates an example radio network controller or core network node, in accordance with certain embodiments.

FIG. 15 illustrates an example radio network controller or core network node 1200, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 1220 (e.g., which may include one or more processors), memory 1230, and network interface 1240. In some embodiments, processing circuitry 1220 executes instructions to provide some or all of the functionality described above as being provided by the network node, memory 1230 stores the instructions executed by processing circuitry 1220, and network interface 1240 communicates signals to any suitable node, such as a gateway, switch, router, Internet, Public Switched Telephone Network (PSTN), network nodes 915, radio network controllers or core network nodes, etc.

Processing circuitry 1220 may include any suitable combination of hardware and software implemented in one or more modules to execute instructions and manipulate data to perform some or all of the described functions of the radio network controller or core network node. In some embodiments, processing circuitry 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processing circuitry 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 15 that may be responsible for providing certain aspects of the network node's functionality, including any of the functionality described above and/or any additional functionality (including any functionality necessary to support the solution described above).

EXAMPLE EMBODIMENTS

1. A method by a wireless device for determining Hybrid Automatic Repeat Request (HARQ) codebook size, comprises:
detecting, by the wireless device, a downlink assignment comprising at least one Physical Uplink Control Channel (PUCCH) configuration parameter and a codebook size parameter; and
based on the codebook size parameter, determining, by the wireless device, a size of a codebook to be used in transmitting feedback to a network node on the PUCCH;
using, by the wireless device, the size of the codebook to generate the feedback to be transmitted to the network node on the PUCCH; and
transmitting the feedback to the network node.

2. The method of example embodiment 1, wherein detecting the DL assignment comprises receiving the DL assignment from the network node.

3. The method of any of example embodiments 1 to 2, wherein the wireless device is a user equipment (UE).

4. The method of any of example embodiments 1 to 3, wherein the codebook size parameter identifies the size of the codebook to be used in transmitting feedback to the network node.

5. The method of any of example embodiments 1 to 4, wherein the wireless device determines the size of the codebook based one the code size parameter and at least one additional parameter.

6. The method of any of example embodiments 1 to 5, wherein the wireless device receives fewer DL assignments than the codebook can carry, and the method further comprises:
setting, by the wireless device, any bits corresponding to not received DL assignments to a fixed value.

7. The method of example embodiment 6, wherein the fixed value is a Not-acknowledgment (NACK).

8. The method of any of example embodiments 1 to 7, wherein the PUCCH configuration comprises a channel code type.

9. The method of example embodiment 8, further comprising:
if the codebook size is less than or equal to 11 bits, using Reed Muller encoding; or
if the codebook size is greater than 11, using Polar encoding.

10. The method of any of example embodiments 1 to 7, wherein the PUCCH configuration does not include an explicit channel coding configuration, and the method further comprises:

determining a channel code by using an existing coding rule based on the configured codebook size rather than an actual UCI size.

11. The method of any of example embodiments 1 to 7, wherein the PUCCH configuration comprises a PUCCH resource that is explicitly configured with a channel code, and the method further comprises:

determining the codebook size based on the channel code.

12. A wireless device comprising memory operable to store instructions and processing circuitry operable to execute the instructions, whereby the wireless device is operable to perform any of the methods of example embodiments 1 to 11.

13. A computer program product comprising a non-transitory computer readable medium storing computer readable program code, the computer readable program code comprises program code for performing any of the methods of example embodiments 1 to 11.

14. A method by a network node for determining Hybrid Automatic Repeat Request (HARQ) codebook size, comprises:

determining, by the network node, a codebook size parameter to be used by a wireless device in determining a size of a codebook for providing feedback to the network node;

transmitting, by the network node, a downlink assignment to a wireless device, the downlink assignment comprising at least one Physical Uplink Control Channel (PUCCH) configuration parameter and the codebook size parameter; and receiving, on the PUCCH, the feedback formatted based on at least the codebook size parameter.

15. The method of example embodiment 14, wherein the wireless device is a user equipment (UE).

16. The method of any of example embodiments 14 to 15, wherein the codebook size parameters identifies the size of the codebook to be used in transmitting feedback to the network node.

17. The method of any of example embodiments 14 to 16, wherein the size of the codebook is determined based on the code size parameter and at least one additional parameter.

18. The method of any of example embodiments 14 to 17, further comprising:

transmitting fewer DL assignments than the codebook can carry; and receiving, from the wireless device, a NACK in any bits corresponding to not received DL assignments.

19. The method of any of example embodiments 14 to 18, wherein the PUCCH configuration comprises a channel code type.

20. The method of example embodiment 19, wherein:

if the codebook size is less than or equal to 11 bits, the feedback is encoded using Reed Muller encoding; or if the codebook size is greater than 11, the feedback is encoded using Polar encoding.

21. The method of any of example embodiments 14 to 18, wherein the PUCCH configuration does not include an explicit channel coding configuration, and the method further comprises:

configuring the wireless device to determine a channel code by using an existing coding rule based on the configured codebook size rather than an actual UCI size.

22. The method of any of example embodiments 14 to 18, wherein the PUCCH configuration comprises a PUCCH resource that is explicitly configured with a channel code, and the method further comprises:

configuring the wireless device to determine the codebook size based on the channel code.

23. A network node comprising memory operable to store instructions and processing circuitry operable to execute the instructions, whereby the network node is operable to perform any of the methods of example embodiments 14 to 22.

24. A computer program product comprising a non-transitory computer readable medium storing computer readable program code, the computer readable program code comprises program code for performing any of the methods of example embodiments 14 to 22.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

ABBREVIATIONS

| Abbreviation | Explanation |
| --- | --- |
| 3GPP | $3^{rd}$ Generation Partnership Project |
| 5G | $5^{th}$ Generation |
| ACK | Acknowledgement |
| ACK/NACK | Acknowledgment/Not-acknowledgment |
| BER | Bit Error Rate |
| CBG | Code Block Group |
| C-MTC | Critical MTC (Also referred to as Ultra Reliable and Low Latency Communication (URLLC).) |
| CP | Cyclic Prefix |
| DAI | Downlink Assignment Indicator |
| DCI | Downlink Control Information |
| DFT | Discrete Fourier Transform |
| DMRS | Demodulation Reference Signal |
| eNB | Evolved NodeB |
| gNB | The term for a radio base station in NR (corresponding to eNB in LTE) |
| HARQ | Hybrid Automatic Repeat Request |
| ID | Identity/Identifier |
| IE | Information Element |
| IM | Index Modulation |
| LTE | Long Term Evolution |
| MIB | Master Information Block |
| MIMO | Multiple-Input Multiple-Output |
| ML | Maximum Likelihood Detection |
| MSG | Message |
| M-MTC | Massive MTC |
| MTC | Machine Type Communication |
| NACK | Not-acknowledgment |
| NGC | Next Generation Core |

-continued

| ABBREVIATIONS | |
|---|---|
| Abbreviation | Explanation |
| NR | New Radio (The term used for the 5G radio interface and radio access network in the technical reports and standard specifications 3GPP are working on.) |
| OFDM | Orthogonal Frequency Division Multiple Access |
| PAPR | Peak to Average Power Ratio |
| PBCH | Physical Broadcast Channel |
| PCI | Physical Cell Identity |
| PDCCH | Physical Downlink Control Channel |
| PDSCH | Physical Shared Data Channel or Physical Downlink Shared Channel |
| PLMN | Public Land Mobile Network |
| PR | PUCCH Resource |
| PRACH | Physical Random Access Channel |
| PRB | Physical Resource Block |
| PSS | Primary Synchronization Signal |
| PUCCH | Physical Uplink Control Channel |
| QAM | Quadrature Amplitude Modulation |
| QCL | Quasi-Co-Located |
| RA | Random Access |
| RAN | Random Access Network |
| RAR | Random Access Response |
| RMSI | Remaining Minimum System Information |
| RRC | Radio Resource Control |
| SFN | Single Frequency Network |
| SI | System Information |
| SIB | System Information Block |
| SM | Spatial Modulation |
| SNR | Signal to Noise Ratio |
| SR | Scheduling Request |
| SS | Synchronization Signal |
| SSS | Secondary Synchronization Signal |
| TDM | Time Division Multiple Access |
| TRP | Transmission/Reception Point |
| UCI | Uplink Control Information |
| UE | User Equipment |
| UL | Uplink |

The invention claimed is:

1. A method by a wireless device for transmitting Hybrid Automatic Repeat Request (HARQ) feedback, comprises:
   obtaining, by the wireless device, a Physical Uplink Control Channel (PUCCH) configuration parameter comprising a channel code type and a PUCCH resource that is explicitly configured with the channel code type, the PUCCH resource comprising a PUCCH timing indication and/or Acknowledgement/Not-Acknowledgement (ACK/NACK) resource indicator (ARI);
   determining a codebook size based on the channel code type;
   based on the PUCCH configuration parameter comprising the channel code type, selecting a PUCCH format for transmitting the HARQ feedback to a network node on the PUCCH; and
   transmitting the HARQ feedback to the network node.

2. The method of claim 1, wherein obtaining the PUCCH configuration parameter comprises receiving a DL assignment from the network node.

3. The method of claim 1, wherein the HARQ feedback is transmitted using a ≤2 bit PUCCH resource.

4. The method of claim 3, wherein:
   only one bit of the ≤2 bit PUCCH resource comprises the HARQ feedback, and
   any additional bit of the ≤2 bit PUCCH resource is set to a fixed value.

5. A wireless device for providing Hybrid Automatic Repeat Request (HARQ) feedback comprising:
   memory operable to store instructions; and
   processing circuitry operable to execute the instructions to cause the wireless device to:
   obtain a Physical Uplink Control Channel (PUCCH) configuration parameter comprising a channel code type and a PUCCH resource that is explicitly configured with the channel code type, the PUCCH resource comprising a PUCCH timing indication and/or Acknowledgement/Not-Acknowledgement (ACK/NACK) resource indicator (ARI);
   determine a codebook size based on the channel code type;
   based on the PUCCH configuration parameter comprising the channel code type, select a PUCCH format for transmitting the HARQ feedback to a network node on the PUCCH; and
   transmit the HARQ feedback to the network node.

6. The wireless device of claim 5, wherein obtaining the PUCCH configuration parameter comprises receiving a DL assignment from the network node.

7. The wireless device of claim 5, wherein the HARQ feedback is transmitted using a ≤2 bit PUCCH resource.

8. The wireless device of claim 7, wherein:
   only one bit of the ≤2 bit PUCCH resource comprises the HARQ feedback, and
   any additional bit of the ≤2 bit PUCCH resource is set to a fixed value.

9. The wireless device of claim 5, wherein:
   the HARQ feedback is transmitted using >2 bit PUCCH resource,
   the wireless device receives fewer DL assignments than a codebook can carry, and
   the processing circuitry is further operable to execute the instructions to cause the wireless device to set any bits corresponding to not received DL assignments to a fixed value.

10. The wireless device of claim 8, wherein the fixed value is a Not-acknowledgment (NACK).

11. The wireless device of claim 5, wherein:
    the PUCCH configuration parameter further comprises a codebook size parameter, and
    the processing circuitry is further operable to execute the instructions to cause the wireless device to select a codebook at least partially based on the codebook size parameter.

12. The wireless device of claim 11, the processing circuitry is further operable to execute the instructions to cause the wireless device to:
    if the codebook size is less than or equal to 11 bits, use Reed Muller encoding to encode the HARQ feedback; or
    if the codebook size is greater than 11, use Polar encoding to encode the HARQ feedback.

13. The wireless device of claim 5, wherein obtaining the PUCCH configuration parameter comprises receiving the PUCCH configuration parameter via RRC signaling from the network node.

14. The wireless device of claim 5, wherein the wireless device is a user equipment (UE).

15. A method by a network node for receiving Hybrid Automatic Repeat Request (HARQ) feedback, comprises:
    transmitting, to a wireless device, a Physical Uplink Control Channel (PUCCH) configuration parameter comprising a channel code type and a PUCCH resource that is explicitly configured with the channel code type, the PUCCH resource comprising a PUCCH timing indication and/or Acknowledgement/Not-Acknowledgement (ACK/NACK) resource indicator (ARI), wherein a codebook size is based on the channel code type; and receiving, on the PUCCH and via the PUCCH resource, the HARQ feedback formatted based on at least the channel code type.

16. A network node for receiving Hybrid Automatic Repeat Request (HARQ) feedback, the network node comprising:
    memory operable to store instructions; and
    processing circuitry operable to execute the instructions to cause the network node to:
    transmit, to a wireless device, a Physical Uplink Control Channel (PUCCH) configuration parameter comprising a channel code type and a PUCCH resource that is explicitly configured with the channel code type, the PUCCH resource comprising a PUCCH timing indication and/or Acknowledgement/Not-Acknowledgement (ACK/NACK) resource indicator (ARI), wherein a codebook size is based on the channel code type; and
    receive, on the PUCCH and via the PUCCH resource, the HARQ feedback formatted based on at least the channel code type.

17. The network node of claim 16 wherein transmitting the PUCCH configuration parameter comprises transmitting a DL assignment to the wireless device.

18. The network node of claim 16, wherein the HARQ feedback is received using a ≤2 bit PUCCH resource.

19. The network node of claim 18, wherein:
    only one bit of the ≤2 bit PUCCH resource comprises the HARQ feedback, and
    any additional bit of the ≤2 bit PUCCH resource is set to a fixed value.

20. The network node of claim 16, wherein:
    the HARQ feedback is received using >2 bit PUCCH resource, and
    any bits corresponding to not received DL assignments are set to a fixed value.

21. The network node of claim 19, wherein the fixed value is a Not-acknowledgment (NACK).

22. The network node of claim 16, wherein:
    the PUCCH configuration parameter further comprises a codebook size parameter for selecting a codebook for the HARQ feedback.

23. The network node of claim 22, wherein the processing circuitry is operable to execute the instructions to cause the network node to:
    if the codebook size is less than or equal to 11 bits, use Reed Muller decoding to decode the HARQ feedback; or
    if the codebook size is greater than 11, use Polar decoding to decode the HARQ feedback.

24. The network node of claim 16, wherein transmitting the PUCCH configuration parameter comprises transmitting the PUCCH configuration parameter via RRC signaling.

* * * * *